United States Patent
Zhu et al.

(10) Patent No.: US 11,418,385 B2
(45) Date of Patent: Aug. 16, 2022

(54) NETWORK ALARM METHOD, DEVICE, SYSTEM AND TERMINAL

(71) Applicant: ZTE Corporation, Shenzhen (CN)

(72) Inventors: Weihong Zhu, Shenzhen (CN); Feng Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/962,597

(22) PCT Filed: Jan. 2, 2019

(86) PCT No.: PCT/CN2019/070101
§ 371 (c)(1),
(2) Date: Jul. 16, 2020

(87) PCT Pub. No.: WO2019/141089
PCT Pub. Date: Jul. 25, 2019

(65) Prior Publication Data
US 2020/0403851 A1 Dec. 24, 2020

(30) Foreign Application Priority Data
Jan. 16, 2018 (CN) .......................... 201810041521.X (51) Int. Cl.
*H04L 41/0686* (2022.01)
*H04W 24/08* (2009.01)

(52) U.S. Cl.
CPC ......... *H04L 41/0686* (2013.01); *H04W 24/08* (2013.01)

(58) Field of Classification Search
CPC ........... H04L 25/03019; H04L 41/0654; H04L 41/0677; H04L 41/069; H04L 41/0836; H04L 41/0853; H04L 41/0886; H04L 41/0896; H04L 41/5003; H04L 41/5009; H04L 41/0686; H04L 41/065;
(Continued)

(56) References Cited

U.S. PATENT DOCUMENTS

2017/0332226 A1   11/2017   Bharatia
2018/0123870 A1 *  5/2018   Xue ................... H04L 41/0663
(Continued)

FOREIGN PATENT DOCUMENTS

CN   106572517 A   4/2017
CN   106792888 A   5/2017
(Continued)

OTHER PUBLICATIONS

3GPP TR 28.801 V15.0.0, dated Sep. 2017 (Year: 2017).*
(Continued)

*Primary Examiner* — Daniel Lai
(74) *Attorney, Agent, or Firm* — Cantor Colburn LLP (57) ABSTRACT

Provided are a network alarm method, apparatus, system and terminal. The method includes: receiving, by a network slicing management function (NSMF), reported alarm information, where the alarm information includes at least one of an identifier of a network slice or an identifier of a network slice subnet; the alarm information received by the NSMF is reported by a network function (NF), a network function management function (NFMF) or a network slice subnet management function (NSSMF).

14 Claims, 6 Drawing Sheets

(58) Field of Classification Search
CPC ............. H04L 41/0631; H04L 41/0893; G06F 11/327; G06F 11/3612; H04W 24/02; H04W 36/30; H04W 74/0841; H04W 24/08
See application file for complete search history.

(56) References Cited

U.S. PATENT DOCUMENTS

| | | | | |
|---|---|---|---|---|
| 2019/0230004 | A1* | 7/2019 | Zhou | H04L 67/10 |
| 2019/0386878 | A1* | 12/2019 | Chou | H04W 4/50 |
| 2020/0059407 | A1* | 2/2020 | Lu | H04L 41/0893 |
| 2020/0177473 | A1* | 6/2020 | Xu | H04L 41/5025 |
| 2020/0344126 | A1* | 10/2020 | Fang | H04L 41/0803 |

FOREIGN PATENT DOCUMENTS

| | | |
|---|---|---|
| CN | 107222318 A | 9/2017 |
| CN | 107231384 A | 10/2017 |
| CN | 107566145 A | 1/2018 |
| WO | 2017123277 A1 | 7/2017 |

OTHER PUBLICATIONS

3GPP. "3GPP TR 28.801 V.0.0", 3GPP: Technical Specification Group Services and Systems Aspects: Telecommunication Management; Study on Management and Orchestration of Network Slicing for Next Generation Network (Release 15), Sep. 30, 2017.

Huawei, "pCR 28.800 Add Intergrated Management Architecture Option S5-176349", 3GPP TSG SA WG5 (Telecom Management) Meeting #116, Dec. 1, 2017.

International Search Report for corresponding application PCT/CN2019/070101 filed Jul. 25, 2019; dated Mar. 29, 2019.

Chinese Office Action corresponding application 201810041521X filed Jan. 16, 2018, Report dated Mar. 11, 2021.

Chinese Search Report for corresponding application 201810041521X filed Jan. 16, 2018 Report dated Mar. 3, 2021.

3rd Generation Partnership Project, Technical Specification Group Services and Systems Aspects, France, vol. SA WG5, Jan. 4, 2018, pp. 1-23, XP051392231.

Anonymous, "3rd Generation Partnership Project: Technical Specification Group Services and Systems Aspects" 3GPP Standard, France, vol. SA WG5, Jan. 4, 2018, pp. 1-75, XP0541392292.

3rd Generation Partnership Project, Technical Specification Group Services and Systems Aspects, France, vol. SA WG5, Jan. 4, 2018, pp. 1-23, XP051392291.

Anonymous, "3rd Generation Partnership Project: Technical Specification Group Services and Systems Aspects" 3GPP Standard, France, vol. SA WG5, Jan. 4, 2018, pp. 1-75, XP051392292.

Chinese Office Action for corresponding application 201810041521. X; Report dated Aug. 11, 2021.

European Search Report for corresponding application EP 19740686; Report dated Aug. 31, 2021.

Huawei, "Add Potential Solution for NSI Supervision", 3GPP TSG SA WG5 (Telecomm Management) Meeting #113, May 8-12, 2017, S5-173155.

Huawei, "pcR 28.xxx Add Use Case and Requirements on alarm notification of a network slice Instance", 3GPP TSG SA WG5 (Telecom Management) Meeting #116, Nov. 27-Dec. 1, 2017, S5-176136.

* cited by examiner

A NSMF receives reported alarm information, where the alarm information includes an identifier of a network slice and/or an identifier of a network slice subnet —S1010

A NSSMF receives reported alarm information, where the alarm information includes an identifier of a network slice and/or an identifier of a network slice subnet — S9010

NETWORK ALARM METHOD, DEVICE, SYSTEM AND TERMINAL

CROSS-REFERENCE TO RELATED APPLICATIONS

This is a National Stage Application, filed under 35 U.S.C. 371, of International Patent Application No. PCT/CN2019/070101, filed on Jan. 2, 2010, which claims the priority of Chinese patent application No. 201810041521.X filed with CNIPA on Jan. 16, 2018, contents of both which are incorporated herein by reference in their entireties.

TECHNICAL FIELD

The present disclosure relates to the field of wireless communication systems, and for example, to a network alarm method, apparatus, system and terminal.

BACKGROUND

The study of the 5th Generation Mobile Communication Technology (5G) has begun in the industry. As a component of the 5G, a network slice is an instantiated complete logical network which is composed of a set of network functions (including network resources supporting these network functions) had has specific network characteristics. The logical network is used for satisfying requirements of a specific network traffic.

When a network slice is complex, for the convenience of management, the network slice may be decomposed into network slice subnets. A network slice subnet refers to a logical network, which has specific network characteristics and is composed of a set of network functions together with network resources supporting the network functions. In general, one network slice may include no network slice subnet, one slice subnet, or more network slice subnets.

As mentioned above, one network slice or one network slice subnet is composed of a set of (one or more) network functions; and one network function may be included in only one network slice or network slice subnet, or may be included in two or more network slices or network slice subnets. In a case where one network function is included in two or more network slices or network slice subnets, the network function is shared by the two or more network slices or network slice subnets. In a case where a network function is shared, management of the network slice, the network slice subnet, and the network function may be different from that in a case where the network function is not shared. However, it is still unknown how to perform reasonable alarm management in the case where a network functions is shared by network slices/network slice subnets.

SUMMARY

The present disclosure provides a network alarm method, apparatus, system and terminal, which can satisfy requirements of performing reasonable alarm management in a case where a network function is shared by network slices/network slice subnets.

In a first aspect, the present disclosure provides a network alarm method, which includes a step described below.

A network slicing management function (NSMF) receives reported alarm information, where the alarm information includes an identifier of a network slice and/or an identifier of a network slice subnet.

The alarm information received by the NSMF is reported by a network function (NF), a network function management function (NFMF) or a network slice subnet management function (NSSMF).

In a second aspect, the present disclosure further provides a network alarm method, which includes steps described below.

A NF generates alarm information, where the alarm information includes an identifier of a network slice and/or an identifier of a network slice subnet; and the NF reports the alarm information to a NFMF, a NSSMF) or a NSMF.

In a third aspect, the present disclosure further provides a network alarm method, which includes a step described below.

A NFMF receives reported alarm information, where the alarm information includes an identifier of a network slice and/or an identifier of a network slice subnet.

The alarm information received by the NFMF is reported by a NF.

In a fourth aspect, the present disclosure further provides a network alarm method, which includes a step described below.

A NSSMF receives reported alarm information, where the alarm information includes an identifier of a network slice and/or an identifier of a network slice subnet.

The alarm information received by the NSSMF is reported by a NF or a NFMF.

In a fifth aspect, the present disclosure further provides a network alarm apparatus, which includes a NSMF.

The NSMF is configured to receive reported alarm information, and the alarm information includes an identifier of a network slice and/or an identifier of a network slice subnet.

The alarm information received by the NSMF is reported by a NF, a NFMF or a NSSMF.

In a sixth aspect, the present disclosure further provides a network alarm apparatus, which includes a NF.

The NF is configured to generate alarm information, where the alarm information includes an identifier of a network slice and/or an identifier of a network slice subnet.

The NF is configured to report the alarm information to a NFMF, a NSSMF or a NSMF.

In a seventh aspect, the present disclosure further provides a network alarm apparatus, which includes a NFMF.

The NFMF is configured to receive reported alarm information, where the alarm information includes one of an identifier of a network slice and/or an identifier of a network slice subnet.

The alarm information received by the NFMF is reported by a NF.

In an eighth aspect, the present disclosure further provides a network alarm apparatus, which includes a NSSMF.

The NSSMF is configured to receive reported alarm information, and the alarm information includes an identifier of a network slice and/or an identifier of a network slice subnet.

The alarm information is reported by a NF or a NFMF.

In a ninth aspect, the present disclosure further provides a network alarm system, which includes the network alarm apparatus described in the fifth aspect and the network alarm apparatus described in any one of the sixth aspect to the eighth aspect.

In a tenth aspect, the present disclosure further provides a terminal, which includes a memory, a processor, and a computer program stored in the memory and executable on the processor. When executing the computer program, the processor implements the method described in any one of the first aspect to the fourth aspect.

DETAILED DESCRIPTION

The present disclosure will be described hereinafter in conjunction with the drawings.

Before the description of the method and apparatus provided by the embodiments of the present disclosure, some terms involved should be explained first.

In the field of managing a wireless communication system, the interface between a network management system (NMS) and an element management system (EMS) is called a northbound interface (Itf-N). The EMS mainly implements an element management layer (EML) function in the international telecommunication union (ITU) and the telecommunications management network (TMN), that is, a management function of one or more mobile communication devices. Generally, EMSs of different device providers are incompatible to each other. The NMS mainly implements a network management layer (NML) function in the ITU and the TMN, and is responsible for managing all network elements in a managed network.

The managed networks is called a subnetwork (with reference to 3rd Generation Partnership Project (3GPP) Technical Specification (TS) 28.622). In a case where multiple device providers exist, a purpose of managing the entire subnetwork can be implemented through EMS management of the respective device providers.

In general, an overall management system of an operator further includes an operation support system (OSS) and a business support system (BSS), and the NMS is generally considered to be included in the OSS and forms a part of the OSS.

A network slice is a component of 5G. The network slice is an instantiated complete logical network, which is composed of a set of network functions (including network resources supporting the network functions) and has specific network characteristics; and the logical network is used for satisfying the requirements of a specific network traffic. The network characteristics here include, for example, ultra-low latency and ultra-high reliability.

The network slice is obtained through instantiation according to a network slice blueprint, so the network slice is also called a network slice instance. The network slice blueprint (template instance) refers to a complete definition used for describing a structure, configuration and workflow of the network slice instance. A NSMF completes instantiation of the network slice and control management of a life cycle of the network slice according to the definition of the network slice blueprint.

When a network slice is complex, for the convenience of management, the network slice may be decomposed into network slice subnets. A network slice subnet refers to a logical network, which is composed of a set of network functions and network resources supporting the network functions, and has specific network characteristics. One network slice may contain no network slice subnet, one network slice subnet, or more network slice subnets. The management and arrangement of the network slice subnet is performed by a NSSMF. The NSSMF completes instantiation of the network slice subnet and control management of a life cycle of the network slice subnet according to the definition of a network slice subnet blueprint.

As mentioned above, a network slice or a network slice subnet is composed of a set of (one or more) network functions. One network function may be included in only one network slice or network slice subnet, or may be included in two or more network slices or network slice subnets.

However, in a case where a network function is shared, management of a network slice, a network slice subnet and a network function may be different from that in a case where a network function is not shared. For example, for fault management, when a shared network function has a fault, it needs to be considered whether the fault affects the network slice or the network slice subnet sharing the network function, so that information of the affected network slice or the affected network slice subnet needs to be included in corresponding alarm information, and this also needs to be considered in alarm processing.

Figure 1:
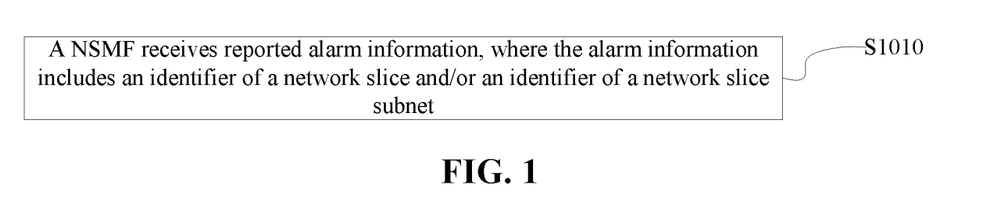
FIG. 1 is a flowchart of a network alarm method according to an embodiment.

Referring to FIG. 1, the present disclosure provides a network alarm method, which includes steps described below.

In S1010, a NSMF receives reported alarm information, where the alarm information includes an identifier of a network slice and/or an identifier of a network slice subnet.

The alarm information received by the NSMF is reported by a NF, a NFMF or a NSSMF.

Figure 2:
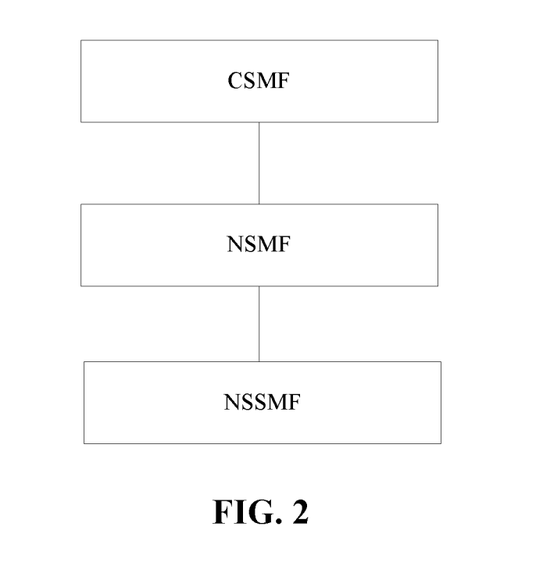
FIG. 2 is a schematic diagram of a management composition of a 5G network slice according to an embodiment.

Referring to FIG. 2, a 5G network slice is used for supporting a specific communication service, so from the perspective of managing the entire 5G network slice, a communication service management function (CSMF) is further included, and management of the 5G network slice is divided into three layers: CSMF-NSMF-NSSMF.

In a first scheme, a management process of a network slice relates to a CSMF, a NSMF, a NSSMF and a NF. Therefore, when the NF sends a fault, alarm information is generally delivered in a direction of NF→NSSMF→NSMF→CSMF. For a case where a shared NF has a fault, in order to deliver information of an affected network slice/network slice subnet, a general processing process includes steps described below.

An optional field "SliceList" (for example, named affectedSliceList) is added into the alarm information and is used to record a unique identifier (e.g., Identifier (ID)) of the affected network slice and/or the affected network slice subnet when the shared NF has the fault.

When the NF has a fault, in addition to generating general alarm information, the NF analyzes the fault, determines whether a network slice and/or a network slice subnet is affected by the fault, and if so, fills an identifier (such as ID and the like) of the affected network slice and/or the affected network slice subnet into an affectedSliceList field of the corresponding alarm information; and the NF reports the alarm to the NSSMF.

After the NSSMF receives the alarm, the NSSMF may perform a corresponding management operation according to the alarm information; the NSSMF further analyzes the alarm, determines whether a network slice is affected by the fault, and if a network slice is affected by the fault and if an identifier of the affected network slice has not been added into the affectedSliceList field of the alarm information, fills the identifier (e.g, ID) of the affected network slice into the affectedSliceList field of the corresponding alarm information; and the NSSMF reports the alarm to the NSMF.

In an embodiment, after the NSMF receives the reported alarm information, the method further includes a step described below. The NSMF performs a corresponding repairing operation on the affected network slice and/or the affected network slice subnet according to the alarm information.

In an embodiment, the NSMF performs a corresponding management operation, such as, but not limited to, fault repairing, according to the received alarm information.

In a second scheme, A NF reports an alarm to a NSMF directly, and steps are described below.

An optional field "SliceList" (for example, named affectedSliceList) is added into alarm information and is used to record a unique identifier (e.g, ID) of an affected network slice and/or an affected network slice subnet when a shared NF has a fault.

When the NF has a fault, the NF generates general alarm information, analyzes the fault, determines whether a network slice and/or a network slice subnet is affected by the fault, and if so, fills an identifier (e.g., ID) of the affected network slice and/or the affected network slice subnet into an affectedSliceList field of the corresponding alarm information; and the NF reports the alarm to a NSMF.

In an embodiment, after the NSMF receives the reported alarm information, the NSMF performs a corresponding repairing operation on the affected network slice and/or the affected network slice subnet according to the alarm information.

In an embodiment, the NSMF performs a corresponding management operation, such as, but not limited to, fault repairing, on the affected network slice and/or the affected network slice subnet according to the received alarm information.

In a third scheme, when a NF is managed by a NFMF, and then managed by a NSSMF through the NFMF, an alarm processing process includes steps described below.

An optional field (for example, named affectedSliceList) is added into alarm information and is used to record a unique identifier (e.g., ID) of an affected network slice and/or an affected network slice subnet when a shared NF has a fault.

When the NF has a fault, in addition to generating general alarm information, the NF analyzes the fault, determines whether a network slice and/or a network slice subnet is affected by the fault, and if so, fills an identifier (e.g., ID) of the affected network slice and/or the affected network slice subnet into an affectedSliceList field of the corresponding alarm information; the NF reports fault information to a NFMF corresponding to the NF. When generating corresponding alarm information, the NFMF analyzes the fault, determines whether a network slice and/or a network slice subnet is affected by the fault, and if so, fills an identifier (e.g., ID) of the affected network slice and/or the affected network slice subnet into the affectedSliceList field of the corresponding alarm information; the NFMF reports the alarm to a NSSMF; after receiving the alarm, the NSSMF may perform a corresponding management operation according to the alarm information; meanwhile, the NSSMF further analyzes the alarm, determines whether a network slice is affected by the fault, and if a network slice is affected by the fault and if an identifier of the affected network slice has not been added into the affectedSliceList field of the alarm information, fills the identifier (e.g., ID) of the affected network slice into the affectedSliceList field of the corresponding alarm information; and the NSSMF reports the alarm to a NSMF.

In an embodiment, after the NSMF receives the reported alarm information, the alarm processing process further includes a step described below. The NSMF performs a corresponding repairing operation on the affected network slice and/or the affected network slice subnet according to the alarm information.

In an embodiment, the NSMF performs a corresponding management operation, such as, but not limited to, fault repairing, on the affected network slice and/or the affected network slice subnet according to the received alarm information.

In a fourth scheme, a NFMF reports an alarm to a NSMF directly, and steps are described below.

An optional field (for example, named affectedSliceList) is added into alarm information and is used to record a unique identifier (e.g., ID) of an affected network slice and/or an affected network slice subnet when a shared NF has a fault.

When the NF has a fault, in addition to generating general alarm information, the NF analyzes the fault, determines whether a network slice and/or a network slice subnet is affected by the fault, and if so, fills an identifier (e.g., ID) of the affected network slice and/or the affected network slice subnet into an affectedSliceList field of the corresponding alarm information; the NF reports fault information to a NFMF corresponding to the NF; the NFMF further analyzes the alarm, determines whether a network slice is affected by the fault, and if a network slice is affected by the fault and if an identifier of the affected network slice has not been added into the affectedSliceList field of the alarm information, fills the identifier (e.g., ID) of the affected network slice into the affectedSliceList field of the corresponding alarm information; and the NFMF reports the alarm to the NSMF.

In an embodiment, after the NSMF receives the reported alarm information, the NSMF performs a corresponding repairing operation on the affected network slice and/or the affected network slice subnet according to the alarm information.

In an embodiment, the NSMF performs a corresponding management operation, such as, but not limited to, fault repairing, on the affected network slice and/or the affected network slice subnet according to the received alarm information.

In this embodiment, in both a first case (the alarm information has an affectedSliceList field no matter if the NF is shared or not) and a second case (only if the NF is shared by two or more network slices or network slice subnets, the alarm information has an affectedSliceList field; and if the NF is not shared, the alarm information does not have an affectedSliceList field), the process of the network alarm is the same as the process in any one of the above schemes, and details are not described here.

In addition, the network slice and the network slice subnet described in the present disclosure actually refer to an instantiated network slice and network slice subnet, so they may also be referred to as a network slice instance and a network slice subnet instance.

The disclosure includes that a NSMF receives reported alarm information, where the alarm information includes an identifier of a network slice and/or an identifier of a network slice subnet. The alarm information received by the NSMF is reported by a NF, a NFMF or a NSSMF. In this way, in a mobile network management technology, under a background of adopting the network slice technology, when a network function shared by multiple network slices/network slice subnets has a fault, the alarm information can be reported in a proper alarm information expression manner, and network performance is greatly improved.

Embodiment 1

Figure 3:
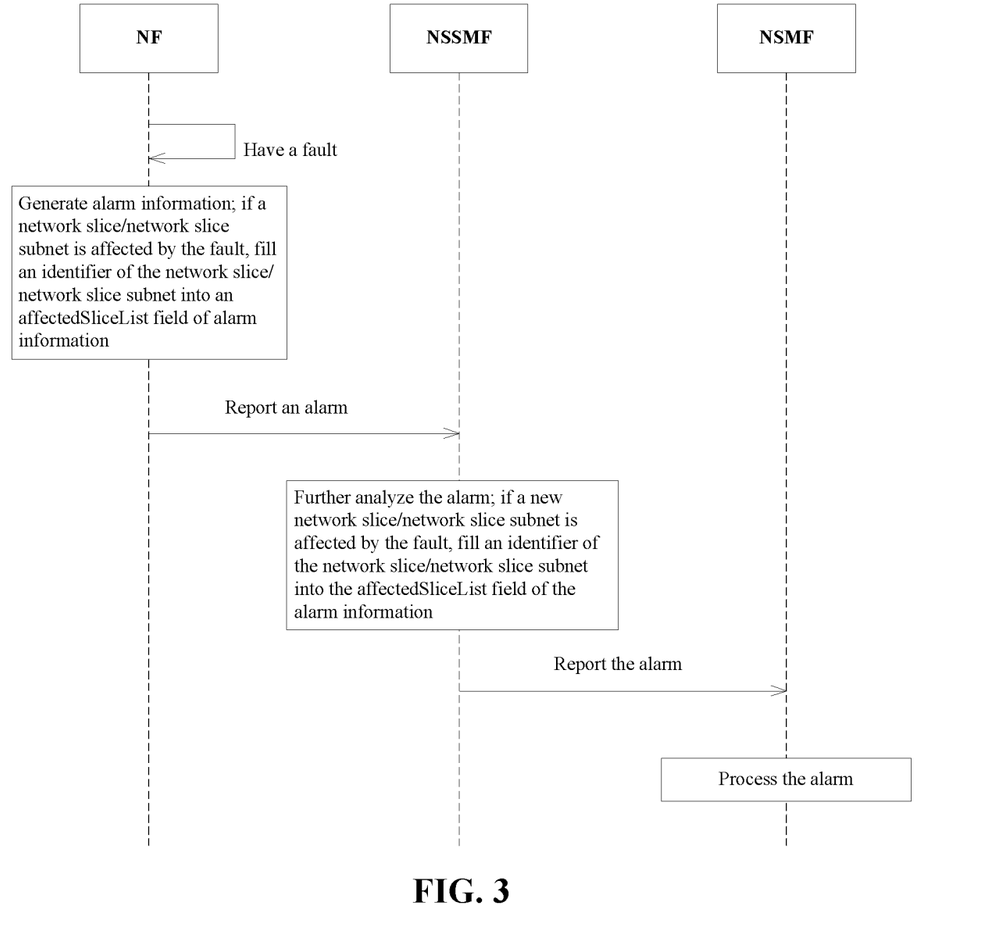
FIG. 3 is an interaction diagram of a network alarm method according to an embodiment.

Referring to FIG. 3, in the present embodiment, an optional field (for example, named affectedSliceList) is added into alarm information and is used to record an ID of an affected network slice and network slice subnet when a shared NF has a fault.

When a NF has a fault, in addition to generating general alarm information, the NF analyzes the fault, determines whether a network slice or a network slice subnet is affected by the fault, and if so, fills an ID of the affected network slice or the affected network slice subnet into an affectedSliceList field of the corresponding alarm information; the NF reports the alarm to a NSSMF.

After receiving the alarm, the NSSMF may perform a corresponding management operation according to the alarm information; meanwhile, the NSSMF further analyzes the alarm, determines whether a network slice is affected by the fault, and if a network slice is affected by the fault and if an identifier of the affected network slice has not been added into an affectedSliceList field of the alarm information, fills the ID of the affected network slice into the affectedSliceList field of the corresponding alarm information; and the NSSMF reports the alarm to a NSMF.

The NSMF performs a corresponding management operation, such as, but not limited to, fault repairing, according to the received alarm information.

Embodiment 2

Figure 4:
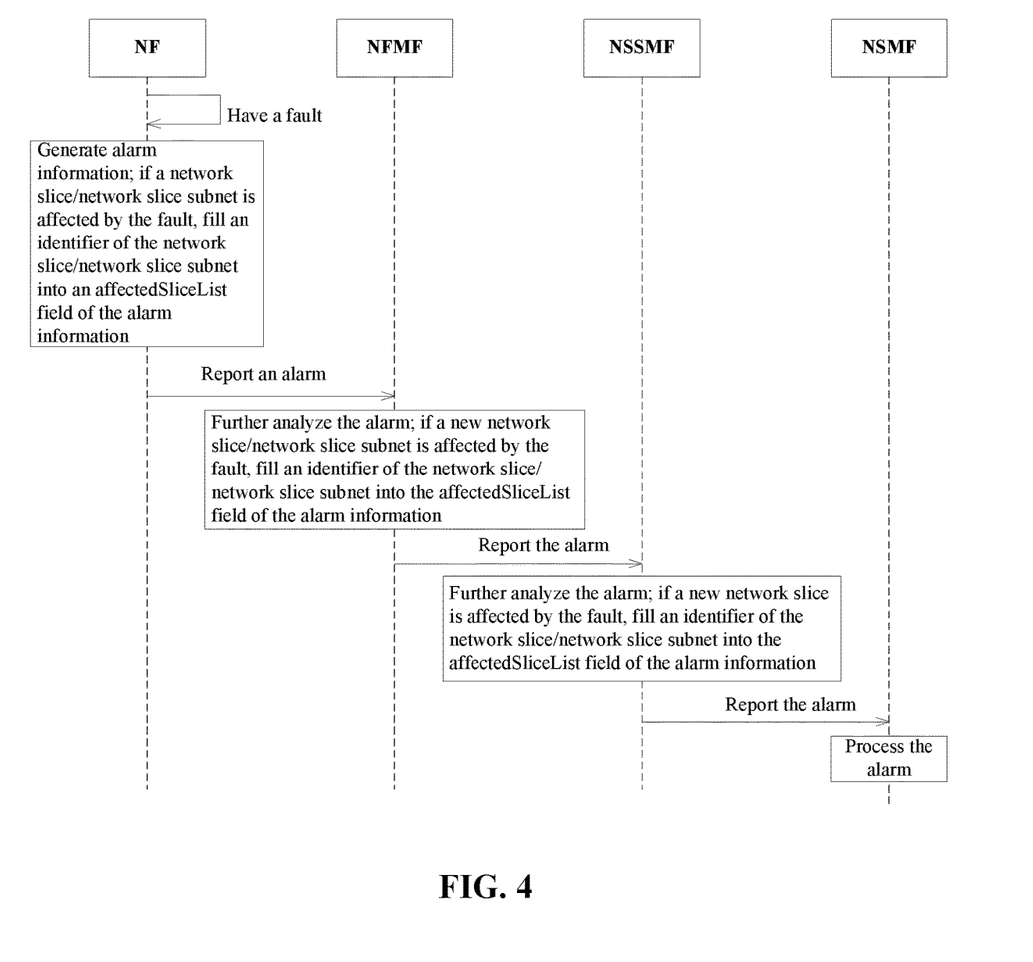
FIG. 4 is an interaction diagram of a network alarm method according to another embodiment.

Referring to FIG. 4, in this embodiment, alarm information is reported to a NSSMF through a NFMF, and steps are described below.

An optional field (for example, named affectedSliceList) is added into alarm information and is used to record an ID of an affected network slice and network slice subnet when a shared NF has a fault.

When a NF has a fault, in addition to generating general alarm information, the NF analyzes the fault, determines whether a network slice or a network slice subnet is affected by the fault, and if so, fills an ID of the affected network slice and/or the affected network slice subnet into an affectedSliceList field of the corresponding alarm information; the NF reports fault information to a corresponding NFMF.

When generating corresponding alarm information, the NFMF analyzes the fault, determines whether a network slice or a network slice subnet is affected by the fault, and if so, fills an ID of the affected network slice and the affected network slice subnet into an affectedSliceList field of the corresponding alarm information; the NF reports the alarm to a NSSMF.

After receiving the alarm, the NSSMF may perform a corresponding management operation according to the alarm information; meanwhile, the NSSMF further analyzes the alarm, determines whether a network slice is affected by the fault, and if a network slice is affected by the fault and if an identifier of the affected network slice has not been added into an affectedSliceList field of the alarm information, fills the ID of the affected network slice into the affectedSliceList field of the corresponding alarm information; and the NSSMF reports the alarm to a NSMF.

The NSMF performs a corresponding management operation, such as, but not limited to, fault repairing, according to the received alarm information.

Embodiment 3

Referring to FIG. 4, in this embodiment, alarm information is reported to a NSSMF through a NFMF, and steps are described below.

When a NF has a fault, in addition to generating general alarm information, the NF analyzes the fault, determines whether a network slice or a network slice subnet is affected by the fault, and if so, fills an ID of the affected network slice and/or the affected network slice subnet into an additionalInformation field or an additionalText field of the corresponding alarm information, where definitions of the additionalInformation field and the additionalText field may be found in 3GPP TS 32.111-2; and the NF reports fault information to the a NFMF corresponding to the NF.

When generating corresponding alarm information, the NFMF analyzes the fault, determines whether a network slice or a network slice subnet is affected by the fault, and if so, fills an ID of the affected network slice and the affected network slice subnet into the additionalInformation field of the corresponding alarm information; the NFMF reports the alarm to a NSSMF.

After receiving the alarm, the NSSMF may perform a corresponding management operation according to the alarm information; meanwhile, the NSSMF further analyzes the alarm, determines whether a network slice is affected by the fault, and if a network slice is affected by the fault and if an identifier of the affected network slice has not been added into an additionalInformation field of the alarm information, fills the ID of the affected network slice into the additionalInformation field of the corresponding alarm information; and the NSSMF reports the alarm to a NSMF.

The NSMF performs a corresponding management operation, such as, but not limited to, fault repairing, according to the received alarm information.

Embodiment 4

Figure 5:
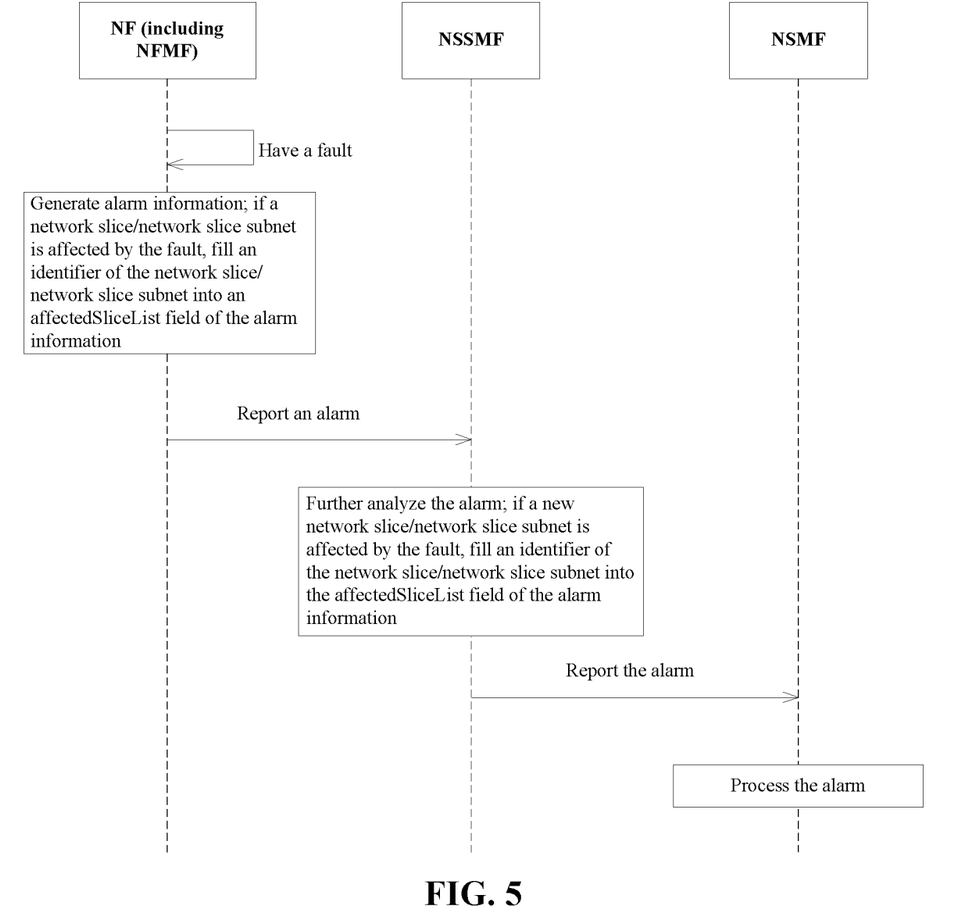
FIG. 5 is an interaction diagram of a network alarm method according to another embodiment.

Referring to FIG. 5, in this embodiment, if a NF contains a NFMF, when the NF has a fault, alarm information is reported to a NSSMF through the NFMF, steps are described below.

An optional field (for example, named affectedSliceList) is added into the alarm information and is used to record an ID of an affected network slice and network slice subnet when a shared NF has a fault.

When a NF has a fault, a NFMF included in the NF analyzes the fault, determines whether a network slice or a network slice subnet is affected by the fault, and if so, fills an ID of the affected network slice and/or the affected network slice subnet into an affectedSliceList field of the corresponding alarm information; the NF reports the alarm to a NSSMF.

After receiving the alarm, the NSSMF may perform a corresponding management operation according to the alarm information; meanwhile, the NSSMF further analyzes the alarm, determines whether a network slice is affected by the fault, and if a network slice is affected by the fault and if an identifier of the affected network slice has not been added into the affectedSliceList field of the alarm information, fills the ID of the affected network slice into the affectedSliceList field of the corresponding alarm information; and the NSSMF reports the alarm to a NSMF.

The NSMF performs a corresponding management operation, such as, but not limited to, fault repairing, according to the received alarm information.

Embodiment 5

Figure 6:
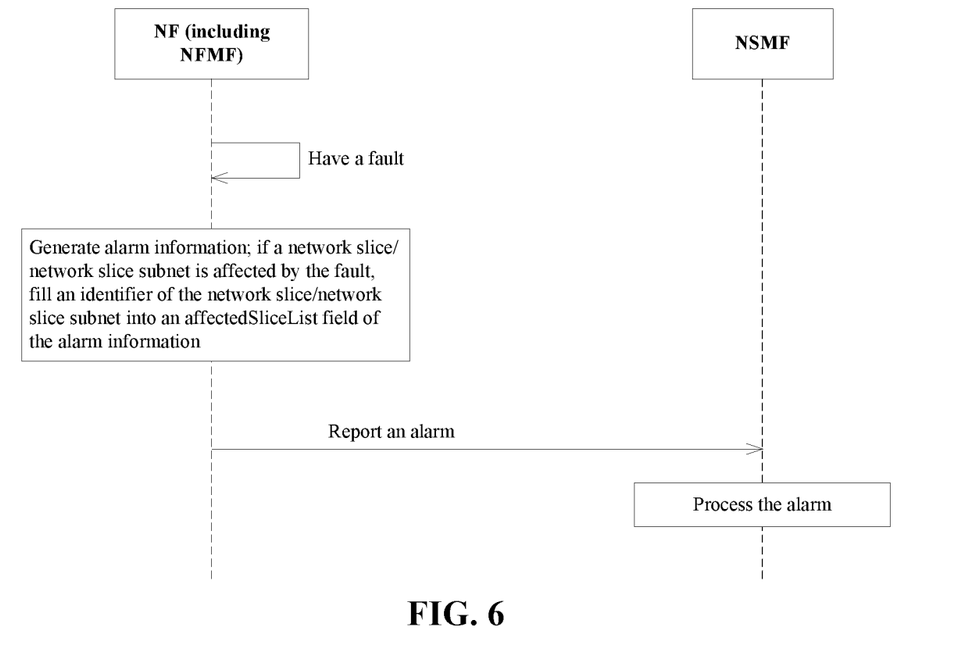
FIG. 6 is an interaction diagram of a network alarm method according to another embodiment.

Referring to FIG. 6, in this embodiment, if a NF contains a NFMF, when the NF has a fault, alarm information is reported to a NSMF through the NFMF, steps are described below.

An optional field (for example, named affectedSliceList) is added into the alarm information and is used to record an ID of an affected network slice and network slice subnet when a shared NF has a fault.

When a NF has a fault, a NFMF included in the NF analyzes the fault, determines whether a network slice or a network slice subnet is affected by the fault, and if so, fills an ID of the affected network slice and/or the affected network slice subnet into an affectedSliceList field of the corresponding alarm information; the NF reports the alarm to a NSMF.

The NSMF performs a corresponding management operation, such as, but not limited to, fault repairing, according to the received alarm information.

Embodiment 6

In this embodiment, if a NF does not include a NFMF, when the NF has a fault, the NF reports alarm information to a NSMF, steps are described below.

An optional field (for example, named affectedSliceList) is added into the alarm information and is used to record an ID of an affected network slice and network slice subnet when a shared NF has a fault.

When a NF has a fault, the NF analyzes the fault, determines whether a network slice or a network slice subnet is affected by the fault, and if so, fills an ID of the affected network slice and/or the affected network slice subnet into an affectedSliceList field of the corresponding alarm information; the NF reports the alarm to a NSMF.

The NSMF performs a corresponding management operation, such as, but not limited to, fault repairing, according to the received alarm information.

With the above-mentioned embodiment, in a mobile network management technology, under a background of adopting the network slice technology, when a network function shared by multiple network slices/network slice subnets has a fault, the alarm information can be reported in a proper alarm information expression manner, and network performance is greatly improved.

Embodiment 7

Figure 7:
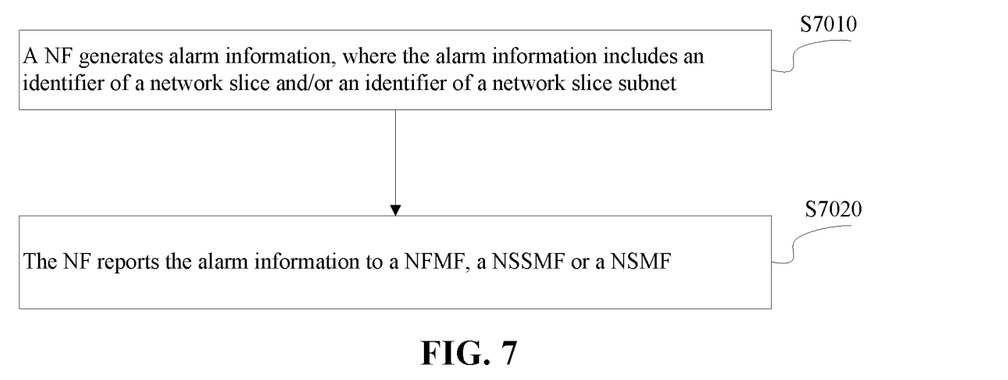
FIG. 7 is a flowchart of a network alarm method according to another embodiment.

Referring to FIG. 7, the present disclosure provides a network alarm method, which includes steps described below.

In step S7010, a NF generates alarm information, where the alarm information includes an identifier of a network slice and/or an identifier of a network slice subnet.

In step S7020, the NF reports the alarm information to a NFMF, a NSSMF or a NSMF.

In an embodiment, when the NF has a fault, the NF analyzes the fault, determines whether a network slice and/or a network slice subnet is affected by the fault, and if so, fills an identifier of the affected network slice and/or an identifier of the affected network slice subnet into the corresponding alarm information.

In an embodiment, in a case where the NF includes a NFMF, when the NF has a fault, the NFMF analyzes the fault, determines whether a network slice and/or a network slice subnet is affected by the fault, and if so, fills an identifier of the affected network slice and/or an identifier of the affected network slice subnet into the corresponding alarm information.

In an embodiment, after the NFMF fills the identifier of the affected network slice and/or the identifier of the affected network slice subnet into the corresponding alarm information, the method further includes a step described below. The NFMF reports the alarm information to the NSSMF or the NSMF.

Embodiment 8

Figure 8:
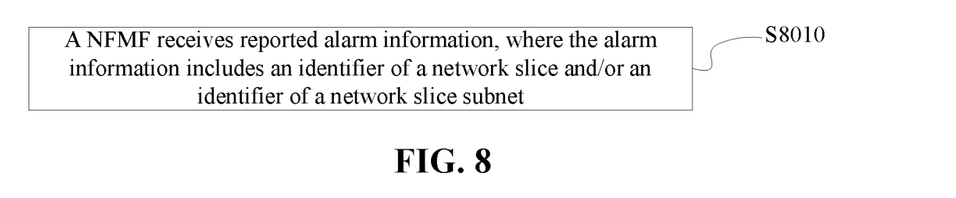
FIG. 8 is a flowchart of a network alarm method according to another embodiment.

Referring to FIG. 8, the present disclosure provides a network alarm method, which includes steps described below.

In step S8010, a NFMF receives reported alarm information, where the alarm information includes an identifier of a network slice and/or an identifier of a network slice subnet.

The alarm information received by the NFMF is reported by a NF.

In this embodiment, the NFMF analyzes according to the alarm information, determines whether a network slice and/or a network slice subnet is affected, and if so and if an identifier of the affected network slice and/or the affected network slice subnet has not been added into the alarm information, fills the identifier of the affected network slice and/or the identifier of the affected network slice subnet into the alarm information.

In an embodiment, after the NFMF fills the identifier of the affected network slice and/or the identifier of the affected network slice subnet into the corresponding alarm information, the method further includes a step described below. The NFMF reports the alarm information to the NSSMF or the NSMF.

Embodiment 9

Figure 9:
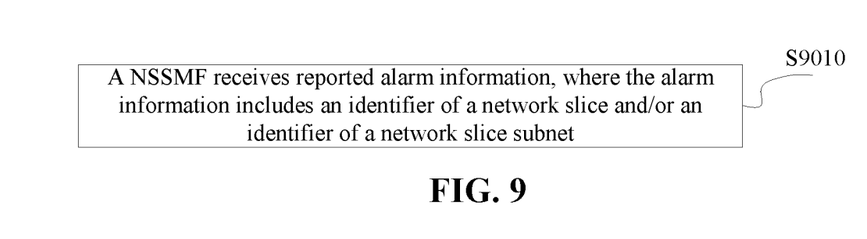
FIG. 9 is a flowchart of a network alarm method according to another embodiment.

Referring to FIG. 9, the present disclosure provides a network alarm method, which includes steps described below.

In step S9010, a NSSMF receives reported alarm information, where the alarm information includes an identifier of a network slice and/or an identifier of a network slice subnet.

The alarm information received by the NSSMF is reported by a NF or a NFMF.

In this embodiment, after the NSSMF receives the reported alarm information, the method further includes steps described below. The NSSMF analyzes according to the alarm information, determines whether a network slice and/or a network slice subnet is affected, and if so and if an identifier of the affected network slice and/or the affected network slice subnet has not been added into the alarm information, fills the identifier of the affected network slice and/or the identifier of the affected network slice subnet into the alarm information.

In this embodiment, after the NSSMF fills the identifier of the affected network slice and/or the identifier of the affected network slice subnet into the alarm information, the method further includes a step described below. The NSSMF reports the alarm information to a NSMF.

Embodiment 10

This embodiment provides a network alarm apparatus, which includes a NSMF.

The NSMF is configured to receive reported alarm information. The alarm information includes an identifier of a network slice and/or an identifier of a network slice subnet. The alarm information received by the NSMF is reported by a NF, a NFMF or a NSSMF.

In this embodiment, the NSMF is further configured to: after receiving the reported alarm information, perform a corresponding repairing operation on an affected network slice and/or an affected network slice subnet according to the alarm information.

Embodiment 11

This embodiment provides a network alarm apparatus, which includes a NF.

The NF is configured to generate alarm information. The alarm information includes an identifier of a network slice and/or an identifier of a network slice subnet.

The NF is further configured to report the alarm information to a NFMF, a NSSMF or a NSMF.

In an embodiment, the NF is configured to generate the alarm information by: when the NF has a fault, analyzing the fault, and determining whether a network slice and/or a network slice subnet is affected by the fault, and if so, filling an identifier of the affected network slice and/or an identifier of the affected network slice subnet into the alarm information.

In an embodiment, the NF includes a NFMF; when the NF has a fault, the NFMF is configured to analyze the fault, and determine whether a network slice and/or a network slice subnet is affected by the fault, and if so, fill an identifier of the affected network slice and/or an identifier of the network slice subnet into the alarm information.

In this embodiment, the NFMF is configured to: after filling the identifier of the affected network slice and/or the identifier of the network slice subnet into the alarm information, report the alarm information to a NSSMF or a NSMF.

Embodiment 12

This embodiment provides a network alarm apparatus, which includes a NFMF.

The NFMF is configured to receive reported alarm information, where the alarm information includes an identifier of a network slice or an identifier of a network slice subnet.

The alarm information received by the NFMF is reported by a NF.

In this embodiment, the NFMF is further configured to: analyze the alarm information, and determines whether a network slice and/or a network slice subnet is affected, if so and if an identifier of the affected network slice and/or an identifier of the affected network slice subnet has not been added into the alarm information, fill the identifier of the affected network slice and/or the identifier of the affected network slice subnet into the alarm information.

In this embodiment, the NFMF is further configured to: after filling the identifier of the affected network slice and/or the identifier of the network slice subnet into the alarm information, report the alarm information to a NSSMF or a NSMF.

Embodiment 13

This embodiment provides a network alarm apparatus, which includes a NSSMF.

The NSSMF is configured to receive reported alarm information, where the alarm information includes an identifier of a network slice and/or an identifier of a network slice subnet.

The alarm information received by the NSSMF is reported by a NF or a NFMF.

In this embodiment, the NSSMF is further configured to: after receiving the reported alarm information, analyze the alarm information, and determines whether a network slice and/or a network slice subnet is affected, if so and if an identifier of the affected network slice and/or the affected network slice subnet has not been added into the alarm information, fill the identifier of the affected network slice and/or the identifier of the affected network slice subnet into the alarm information.

In this embodiment, the NSSMF is further configured to: after the NSSMF fills the identifier of the affected network slice and/or the identifier of the affected network slice subnet into the alarm information, report the alarm information to a NSMF.

Embodiment 14

Based on the same or similar concept as that in the above embodiments, the present disclosure provides a network alarm system, which includes a network alarm apparatus including a NSMF in any one of the above embodiments and a network alarm apparatus in any one of the other above embodiments.

Embodiment 15

Figure 10:
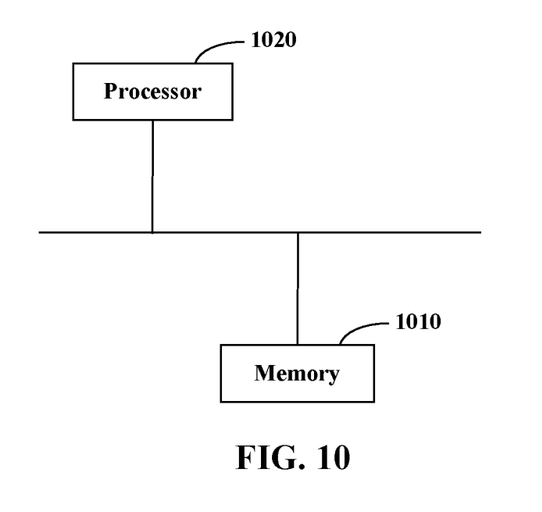
FIG. 10 is a structural diagram of a terminal according to an embodiment.

Based on the same or similar concept as that in the above embodiments, the present disclosure provides a terminal. Referring to FIG. 10, the terminal provided by this embodiment includes a memory 1010, a processor 1020, and a computer program stored in the memory 1010 and executable on the processor 1020. When executing the computer program, the processor 1020 implements the network alarm method provided by any one of the above embodiments.

What is claimed is:

1. A network alarm method, comprising:
   receiving, by a network slicing management function (NSMF), reported alarm information, wherein the alarm information comprises at least one of an identifier of a network slice or an identifier of a network slice subnet;
   wherein, the alarm information received by the NSMF is reported by a network function (NF);
   in a case where the NF comprises a network function management function (NFMF),
   in response to that the NF has a fault, analyzing, by the NFMF, the fault; and
   in response to determining that at least one of a network slice or a network slice subnet is affected by the fault, filling at least one of an identifier of the affected network slice or an identifier of the affected network slice subnet into the alarm information.

2. The method of claim 1, wherein after receiving, by the NSMF, the reported alarm information, the method further comprises:
performing, by the NSMF, a corresponding repairing operation, on at least one of an affected network slice or an affected network slice subnet according to the alarm information.

3. A network alarm apparatus, comprising a network slice management function (NSMF),
wherein the NSMF is configured to implement the network alarm method of claim 1.

4. The apparatus of claim 3, wherein the NSMF is further configured to perform a corresponding repairing operation on at least one of an affected network slice or an affected network slice subnet according to the alarm information.

5. A network alarm method, comprising:
receiving, by a network function management function (NFMF), reported alarm information, wherein the alarm information comprises at least one of an identifier of a network slice or an identifier of a network slice subnet;
analyzing, by the NFMF according to the alarm information; and
in response to determining that at least one of a network slice or a network slice subnet is affected and that at least one of an identifier of the affected network slice or an identifier of the affected network slice subnet is not added into the alarm information, filling the at least one of the identifier of the affected network slice or the identifier of the network slice subnet into the alarm information
wherein the alarm information received by the NFMF is reported by a network function (NF).

6. The method of claim 5, wherein after filling, by the NFMF, the at least one of the identifier of the affected network slice or the identifier of the network slice subnet into the alarm information, the method further comprises:
reporting, by the NFMF, the alarm information to a network slice subnet Management function (NSSMF) or a network slicing management function (NSMF).

7. A network alarm apparatus, comprising a network function management function (NFMF),
wherein the NFMF is configured to implement the network alarm method of claim 5.

8. The apparatus of claim 7, wherein the NFMF is further configured to:
analyze according to the alarm information; and
in response to determining that at least one of a network slice or a network slice subnet is affected and at least one of an identifier of the affected network slice or an identifier of the affected network slice subnet is not added into the alarm information, fill at least one of the identifier of the affected network slice or the identifier of the network slice subnet into the alarm information.

9. The apparatus of claim 8, wherein the NFMF is further configured to report the alarm information to a network slice subnet Management function (NSSMF) or a network slicing management function (NSMF) after filling the at least one of the identifier of the affected network slice or the identifier of the network slice subnet into the alarm information.

10. A network alarm method, comprising:
receiving, by a network slice subnet Management function (NSSMF), reported alarm information, wherein the alarm information comprises at least one of an identifier of a network slice or an identifier of a network slice subnet;
wherein the alarm information received by the NSSMF is reported by a network function (NF) or a network function management function (NFMF);
wherein after the NSSMF receives the reported alarm information, the method further comprises:
analyzing, by the NSSMF according to the alarm information; and
in response to determining that at least one of a network slice or a network slice subnet is affected and that at least one of an identifier of the affected network slice or an identifier of the affected network slice subnet is not added into the alarm information, filling the at least one of the identifier of the affected network slice or the identifier of the network slice subnet into the alarm information.

11. The method of claim 10, wherein after filling, by the NSSMF, the at least one of the identifier of the affected network slice or the identifier of the network slice subnet in the alarm information, the method further comprises:
reporting, by the NSSMF, the alarm information to a network slice management function (NSMF).

12. A network alarm apparatus, comprising a network slice subnet Management function (NSSMF),
wherein the NSSMF is configured to implement the network alarm method of claim 10.

13. The apparatus of claim 12, wherein the NSSMF is further configured to: after receiving the reported alarm information,
analyze according to the alarm information; and
in response to determining that at least one of a network slice or a network slice subnet is affected and at least one of an identifier of the affected network slice or an identifier of the affected network slice subnet is not added into the alarm information, fill the at least one of the identifier of the affected network slice or the identifier of the affected network slice subnet into the alarm information.

14. The apparatus of claim 13, wherein the NSSMF is further configured to report the alarm information to a network slicing management function (NSMF) after filling the at least one of the identifier of the affected network slice or the identifier of the affected network slice subnet into the alarm information.

* * * * *